Jan. 18, 1966 V. H. SØRENSEN 3,230,405

MAGNETIC DRIVE SYSTEMS

Filed May 25, 1961 4 Sheets-Sheet 1

Jan. 18, 1966 V. H. SØRENSEN 3,230,405

MAGNETIC DRIVE SYSTEMS

Filed May 25, 1961 4 Sheets-Sheet 2

Jan. 18, 1966 | V. H. SØRENSEN | 3,230,405

MAGNETIC DRIVE SYSTEMS

Filed May 25, 1961 | 4 Sheets-Sheet 3

Jan. 18, 1966 V. H. SØRENSEN 3,230,405

MAGNETIC DRIVE SYSTEMS

Filed May 25, 1961 4 Sheets-Sheet 4

3,230,405

MAGNETIC DRIVE SYSTEMS

Viggo H. Sørensen, Dorchester, Dorset, England, assignor to the United Kingdom Atomic Energy Authority, London, England Filed May 25, 1961, Ser. No. 128,610
Claims priority, application Great Britain, May 25, 1960, 18,580/60; July 19, 1960, 25,202/60
2 Claims. (Cl. 310—94)

This invention relates to magnetic drive systems. The invention makes use of the hysteresis effect of magnetic materials which has already been exploited in the known hysteresis coupling. This type of coupling takes the form of two rotatable members one of which presents a number of pairs of magnetic poles to the other member which is rotationally symetric in shape and is of a material having high hysteresis loss, that is a permanent magnet material. In this material poles are induced which will try to retain their magnetic polarity and when one member is rotated the other will follow rotationally and synchronously.

When the two members are forced to move at different speeds the coupling is slipping and the maximum torque which can be transmitted is proportional to the number of pole pairs, the volume of the high hysteresis material and the area of the hysteresis loop that the material is forced to follow.

According to the invention there is provided a magnetic hysteresis drive system having driving and driven members separated by an air gap across which torque is transmitted by a magnetic force extending between polarising poles in one member and induced poles in the other member in which the said one member provides two sets of interdigitating pole pieces extending respectively from two rings separated magnetically of opposite polarity towards the other member within which the flux path between adjacent pole pieces extends.

According to a further feature of the invention, the magnetic drive system includes an electromagnet which is fixed relative to the driving and driven members and arranged on energization to provide appropriate induced magnetism in the magnetic poles. By making use of a fixed electromagnet for this purpose the need for rubbing electrical contacts for the drive is obviated.

The drive assembly may include means for detecting the onset of slip between the driving and driven members. This may be achieved, again without rubbing contacts, by forming one member with one or more non-homogeneous portions which effect, on slip, a variation in the reluctance of the flux path extending between the members and by providing means for detecting and measuring an electrical signal generated due to change in flux.

In order that the invention may be fully understood reference will now be made to the accompanying drawing in which.

Figure 1:
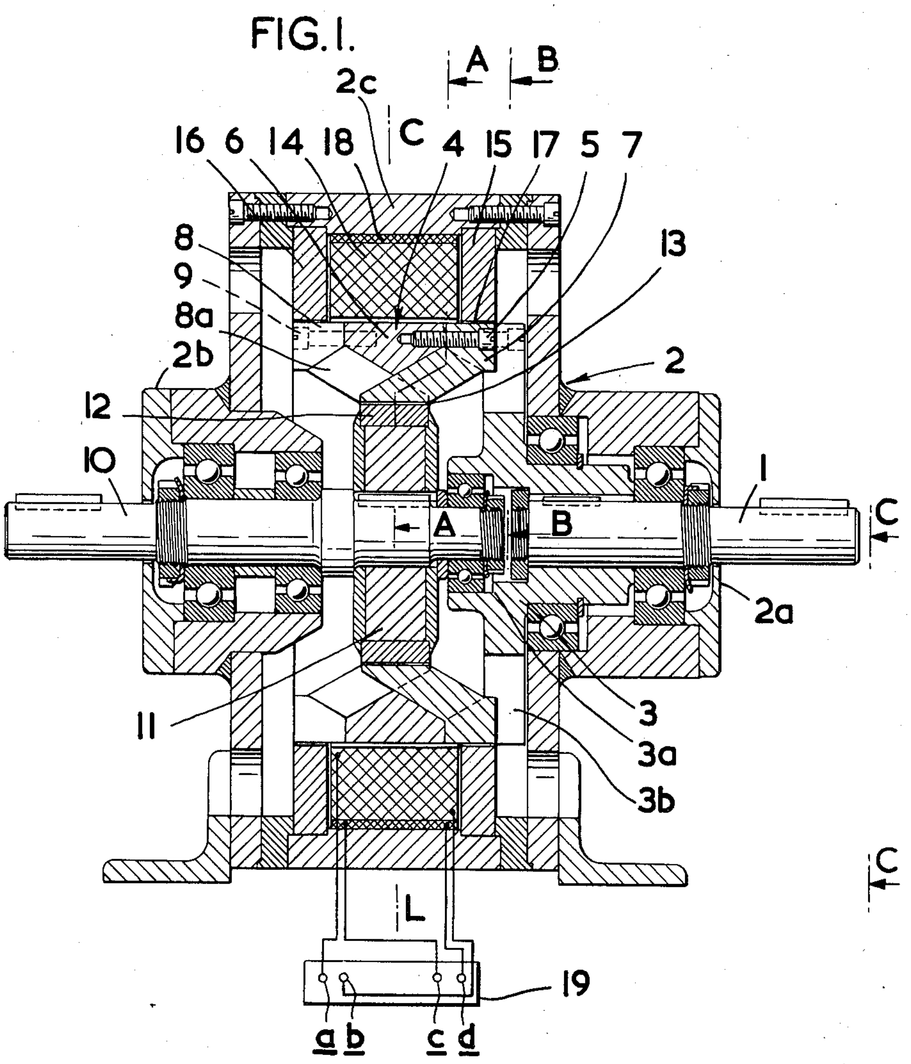
FIG. 1 is a simplified axial cross-section of an electromagnetic clutch.
Figure 2:
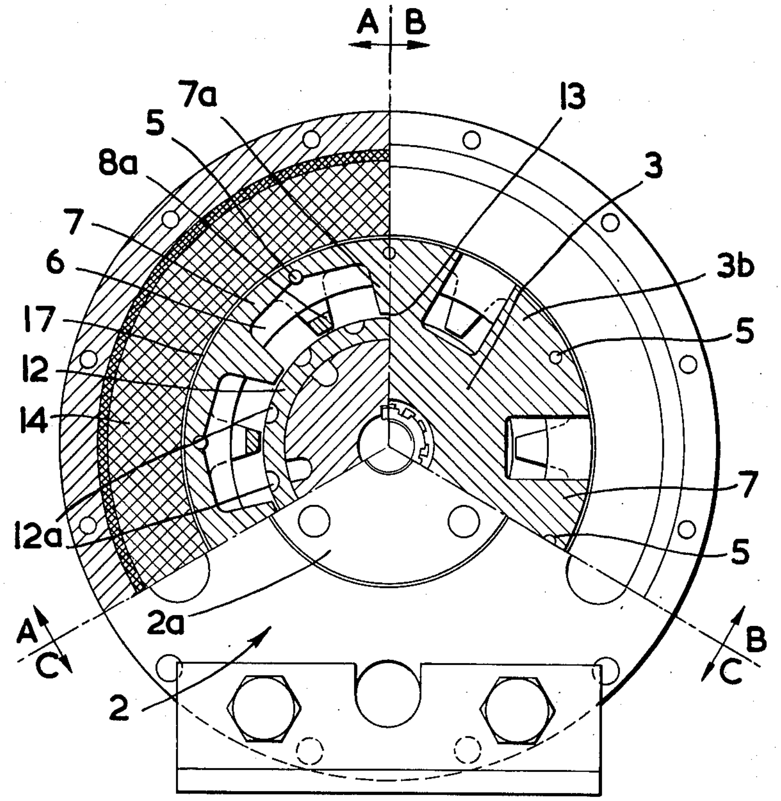
FIG. 2 is a simplified composite view showing cross-sections on the several section lines A—A, B—B, C—C in FIG. 1.

FIGURES 1 and 2, a driving shaft 1 extends through one side *2a* of the clutch casing 2 where it is keyed to a spider 3 of non-magnetic material. The spider 3 has a central boss *3a* from which extend six radial arms *3b*

(FIG. 2) spaced apart at sixty degree intervals around the boss. The arms *3b* carry a ring structure 4 including pole pieces attached to the arms by bolts 5. The ring structure comprises a central annulus 6 of non-magnetic material which serves to space apart rings 7, 8, each having a set of six pole piece *7a*, *8a*, respectively.

As shown, the ring 7 is bolted directly on to the spider arms *3b* by bolts 5 which also serve to secure the central annulus 6 to the spider while the bolts 9 secure the ring 8 to the annulus 6. The pole pieces *7a*, *8a* extend towards the clutch axis and interdigitate to present end faces directed towards the clutch axis on a common radius.

A driven shaft 10 extends through the other side *2b* of the casing 2 being supported in bearings both in the casing wall and, at its free end, within the boss *3a*. Within the casing symmetrically of the centre line CL of FIGURE 1, there is keyed to the shaft 10 a mild steel hub 11 having a low magnetic reluctance which supports at its periphery a ring 12 of a high magnetic hysteresis material, e.g. an aluminium, nickel, cobalt alloy, which has been processed to exhibit a preferential magnetic axis in a radial direction. The periphery of the ring 12 defines with the end faces of the pole pieces *7a*, *8a*, a narrow annular air gap 13.

A cylindrical portion *2c* of the clutch casing 2 supports an annular electromagnet with clearance around the composite ring structure 4, the electro-magnet comprising a field coil 14 between a pair of annular pole pieces 15, 16, spaced apart by portion *2c* defining a yoke and supported in spaced relation to rings 7, 8, by air gap 17. Between the coil 14 and the adjacent parts of the casing, a signal coil 18 is located for the purpose described below.

In operation, the coil 14 is energized by connection to a source of D.C. supply and the path of the magnetic flux is as follows; through the cylindrical yoke portion *2c* of the casing 2 which separates the pole pieces 15, 16, to the annular pole piece 15 across the air gap 17 to the ring 7 and the six pole pieces *7a*, across the air gap 13 and through the ring 12. From a position within the hub 11 adjacent to the next adjacent pole pieces *8a* the magnetic flux again enters the ring 12 and then crosses the air gap 13 to the six pole pieces *8a* and ring 8 passing from the ring 8 to the annular pole piece 16 across air gap 17 and closes the circuit in the cylindrical part *2c* of the casing 2.

When the input shaft 1 is rotated the driven shaft 10 will follow so long as the electro-magnet is energized, provided the applied torque is less than the slipping torque.

The mechanical characteristics for the above arrangement can be found from the following consideration: the work lost by letting the clutch slip one single revolution is the torque (T) times $2\pi$ or the product of: the number of pole pairs *7a*, *8a*, (N), the volume (V) of the ring 12 and the area (A) of the B–H curve (Hysteresis curve) described by the material of which the ring 12 is made:

$$\text{i.e. } 2\pi T = NAV$$

whence $$T = \frac{NAV}{2\pi}$$

Hence by varying the strength of the electro-magnetic field and thereby the value A it is possible to vary the torque at which the clutch will slip.

During slip, there is a relative movement between the assembly of pole pieces *7a*, *8a*, and the ring 12 and by constructing the ring 12 so that there is some variation in reluctance of the flux path at regions indicated at *12a*, there will be some variation in magnetic flux in the system which will induce a certain voltage in the coils 14, 18, proportional to slip speed. In this example non-homogeneous portions in the form of grooves *12a* are formed at intermediate positions between the pole pieces 7a, 8a, so as to vary the relctance of the flux path on slip. Coil 18 thus provides a separate coil from which this voltage signal may be taken, if desired. The electrical connections for the coils 14, 18, are shown here, diagrammatically, taken to terminal block 19, the field coil 14 being connected to terminals *a*, *b*, and coil 18 to terminals *c*, *d*.

Figure 3A:
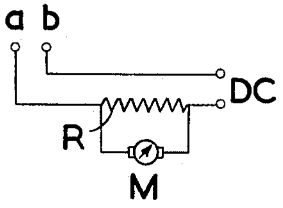
FIGS. 3A–3C show three methods of obtaining a measure or indication of slipping speed.
Figure 3B:
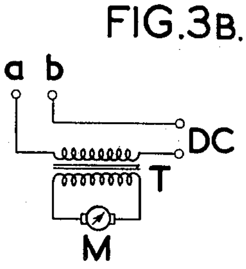
Figure 3C:
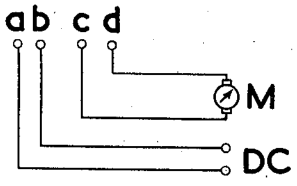

FIGURES 3A–3C show three methods of obtaining an indication, or measure, of slipping speed; FIGURES 3A and 3B deriving a slipping signal from field coil 14, whilst the method in FIGURE 3C makes use of the separate signal coil 18 superimposed on the field coil 14.

In FIGURE 3A a resistance R is connected in series with one lead between the field coil 14 and the D.C. supply, and the voltage variation, induced across the resistance indicated on a meter M, when slip occurs, provides a measure of slipping speed. In FIGURE 3B the field coil 14 is connected to a D.C. supply through the primary winding of a transformer T and an A.C. signal indicative of slipping speed is induced in the secondary winding when relative rotation between driving and driven members occur. The A.C. signal is indicated on meter M.

In FIGURE 3C the field coil 14 is energised by a D.C. supply and an A.C. signal induced in the separate signal coil 18, when slip occurs, is used as a slipping speed indication on meter M.

Figure 4:
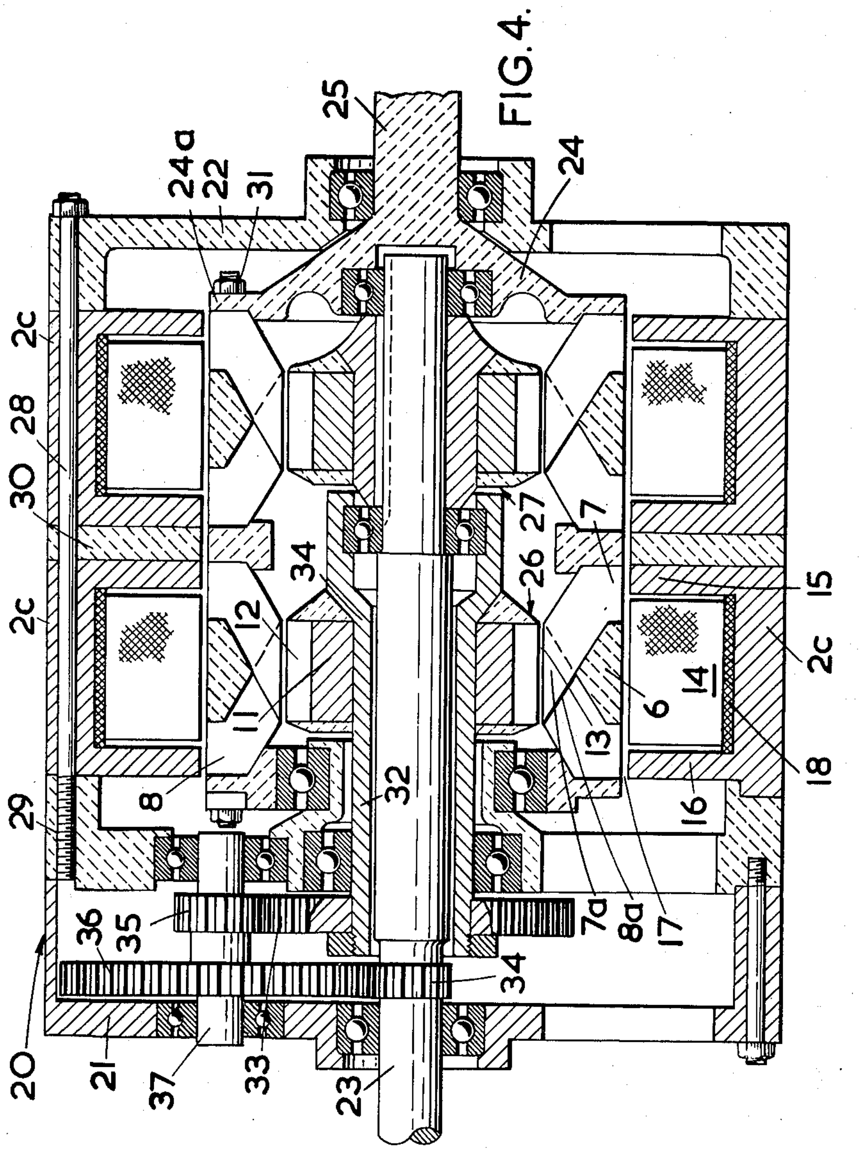
FIG. 4 is an axial cross-section of a gear box incorporating clutches as shown in FIGS. 1 and 2, and FIGS. 5A–5D are torque characteristics of the clutch and of the gear box shown in FIG. 4.

One application of the clutch described above with reference to FIGURES 1–3 is to a two speed gear box shown in FIG. 4 which is a cross section taken axially through its co-axial input and output shafts. Those parts of the gear box formed of non-magnetic material are indicated by broken section lines.

In FIG. 4 the gear box has a composite cylindrical casing 20 with flanged end pieces 21, 22. An input shaft 23 is supported in one set of bearings in the end piece 21 and extends axially within the casing wherein it is journalled in a second set of bearings carried in the recessed hub 24 of an output shaft 25 which extends through end piece 22. Drive between the input and output shaft can only be transmitted when at least one of two similar electro-magnetic clutches, 26, 27, is energised the clutches each being similar in construction and operation to that described with reference to FIGURES 1 and 2. The parts of one clutch 26 bear the same reference numerals as are used to indicate the same parts as shown in FIGURE 1 from which their operation can be understood.

The static parts of the clutches are bolted together by non-magnetic bolts 28 which pass through the end wall 22, the yokes 2*c* and into a ring 29 which is itself fixed to the opposite end piece 21. A non-magnetic, apertured spacer disc 30 between the yokes 2*c* and adjacent pole pieces of the respective electromagnetic of the clutches separates the magnetic circuits of the two clutches. The outer rotary components of clutches, 26, 27, which comprise in each case the rings 7, 8, carrying pole pieces 7*a*, 8*a*, and insulating ring 6 are ganged together by bolts 31 which serve also to secure them to radial extensions 24*a* of the boss 24 of the output shaft 25.

The inner rotary components of the clutches 26, 27, are arranged to be driven by the input shaft 23, that of the clutch 27 by being mounted directly on the shaft 23 near to its free end, while that of the clutch 26 is driven by the shaft 23 through reduction gearing.

To this latter end, the inner rotary component of clutch 26 is carried on sleeve 32 disposed around the shaft 23 and rotatable independently thereof. A gear 33 is fixedly mounted on one end of the sleeve 32 and is arranged to be driven by a gear 34 carried by the input shaft 23 through compound reduction gears 35, 36, fixed on rotatable lay shaft 37.

In operation, a direct following drive between input shaf 23 and output shaft 25 may be obtained by energising clutch 27 alone or alternatively a slow speed, inching, drive may be obtained by energising clutch 26 and de-energising clutch 27. By energising both clutches simultaneously it can be shown that twice the normal torque can be transmitted at low speeds.

Figure 5A:
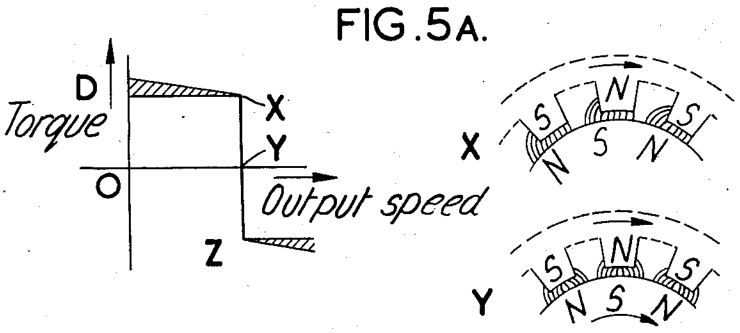

FIGURE 5A shows the torque characteristic of a hysteresis clutch in which line XYZ indicates a critical torque range over which the outer and inner rotary components of the clutch rotate in synchronism. It will be understood at different running points along XYZ the driven component will have its induced polarity displaced by differing amounts relative to the pole pieces of the outer rotary component. For instance, at point Y, with zero torque, poles (of opposite polarity) are induced symmetrically around the inner rotary component member i.e. at positions immediately adjacent the pole pieces of the outer component as shown in the diagram Y. As the torque is increased along Y–X the driven member will tend to lag, magnetically, the driving member and the induced poles in the inner rotary component will be such that the polarity induced by any particular pole piece of the outer rotary component is on the point of being reversed by the next adjacent pole piece of the outer component, as shown in diagram X.

Between X and D any further torque transmitted is due to eddy currents induced in the inner component.

Similar considerations apply over the negative torque part of the characteristic when the outer component absorbs torque by synchronous rotation of the inner component along the line YZ. Beyond point Z, any further torque absorbed by the outer component is due to eddy current braking effects. In both cases, the work transmitted due to eddy currents is shown as a shaded area, whereas the unshaded area DXYO represents the work done by hysteresis. By careful design of the driven component of the clutch, the eddy current effects can be reduced to negligible proportions.

Figure 5B:
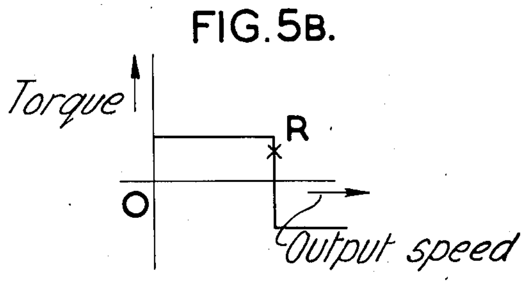
Figure 5C:
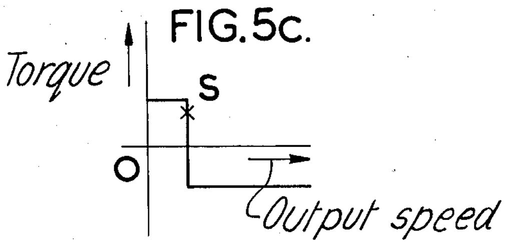
Figure 5D:
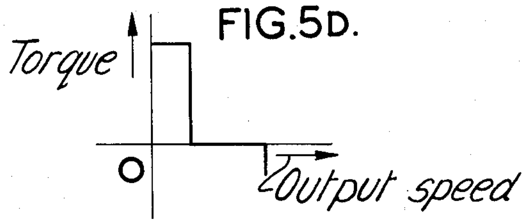

FIGURES 5B and 5C show respectively the relative characteristics of the clutches 26, 27, separately energised. If the clutch 26 solely is energised the output shaft will run at high speed and a running point R is chosen. When clutch 27 is energised alone, the output shaft will run at low speed and at a corresponding torque value, the running point is at the point S. If the two clutches are of the same size and an equal and constant field strength applied to each, then the characteristic will appear as the sum of these characteristics as shown in FIGURE 5D from which it will be seen that twice the torque can be transmitted at a low speed. The period during which both clutches are energised may be limited because of the risk of overheating due to the slipping of the fast clutch 26, and hence this phase of operation is reserved for emergency use.

The magnetic drive systems described above are particularly suited for use in inert gas atmospheres devoid of oxygen, wherein the performance of clutches involving sliding friction surfaces is unsatisfactory or uncertain.

Since rolling bearings are more adaptable for operation in inaccessible positions (where they cannot be reached for maintenance), than are sliding surfaces, the drive system described which does not involve sliding friction is especially advantageous.

The magnetic drive system, therefore, finds advantageous application to rotary motion transmission inside nuclear reactor pressure vessels or within reactor containment. By monitoring or continuous observation of the indicator for slip, an early indication of the build of excessive restraint on mechanisms operated by the drive can be obtained. Alternatively or additionally, the slipping indication may be used from time to time to measure the minimum torque necessary to move the drives so that the inadvertent build up friction in the parts driven by the clutches can be sensed. This may be important where the drive system is employed in a capacity where it is only intermittently used.

For example, in a nuclear reactor the mechanical drives for discharging fuel elements may be used only at infrequent intervals, but they must operate with reliability. In such a case the magnetic drive may be energised from time to time to test not only their own operation, but, by using the slipping indication, also the freedom of the mechanical parts operated by the drive.

What I claim is:

1. A hysteresis coupling comprising a stationary D.C. field winding, a first rotary member, a second rotary member rotatable relative to the first member and to said field winding, said members constituting two couplable parts of said coupling, wherein one of the said members has a plurality of interdigitating pole pieces which are insulated magnetically from one another and magnetizable in two groups of opposite polarity located between the field winding and the other member, said pole pieces extending towards the outer periphery of the other member, said other member having an outer surface layer is provided by a layer of high hysteresis material adapted to complete a magnetic circuit which extends through the pole pieces and to experience a torque dependent upon the hysteresis effects in said outer surface layer, said outer surface layer being formed with at least one non-homogeneous portion which effects a variation in the reluctance, thereby effecting changes in the magnetic flux of the magnetic circuit when slip occurs; a detecting means detecting the electrical signal generated due to the said flux changes and an indicator responsive to said detection means.

2. A magnetic drive system as claimed in claim 1 in which said non-homogeneous regions are produced means defining cut-out portions in the outer surface layer.

References Cited by the Examiner

UNITED STATES PATENTS

| | | | |
|---|---|---|---|
| 2,070,447 | 2/1937 | Morrill | 310—257 X |
| 2,603,678 | 7/1952 | Helmer | 310—103 |
| 2,693,722 | 11/1954 | Winther | 310—99 X |
| 2,759,580 | 8/1956 | Bower | 192—21.5 |
| 2,806,158 | 9/1957 | Emery | 310—103 |
| 2,807,734 | 9/1957 | Lehde | 310—99 X |
| 2,834,895 | 5/1958 | Papst | 310—44 |
| 2,838,702 | 6/1958 | Winther | 310—105 |
| 2,908,832 | 10/1959 | Howe | 310—99 |

FOREIGN PATENTS

| | | |
|---|---|---|
| 743,400 | 1/1956 | Great Britain. |

MILTON O. HIRSHFIELD, *Primary Examiner.*

D. X. SLINEY, *Examiner.*